E. C. LAMPSON.
LOCK.
APPLICATION FILED DEC. 28, 1916.

1,288,053.

Patented Dec. 17, 1918.
2 SHEETS—SHEET 1.

WITNESSES
C. H. Reichenbach
J. E. Larsen

INVENTOR
E. C. Lampson
BY
ATTORNEYS

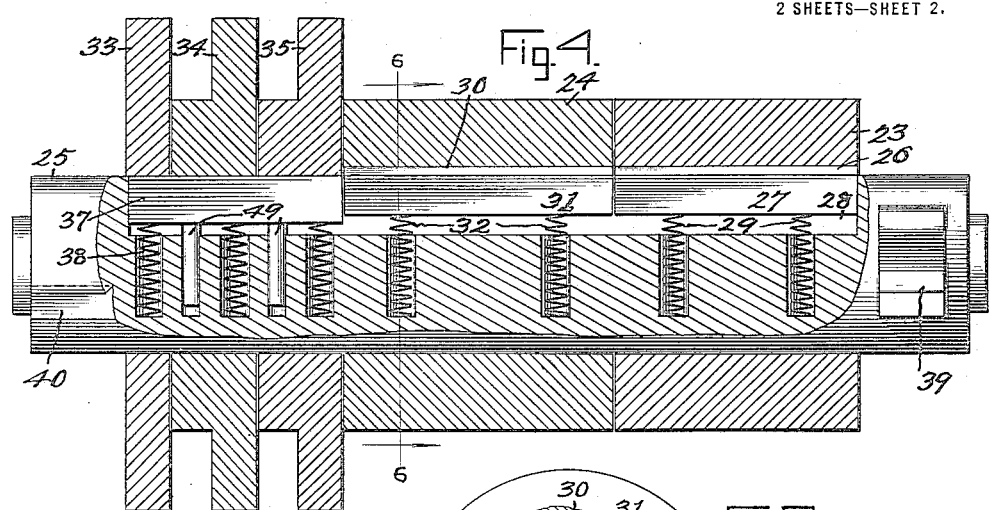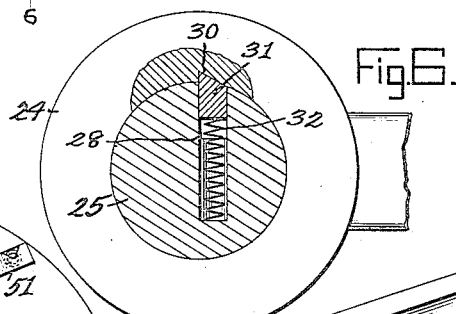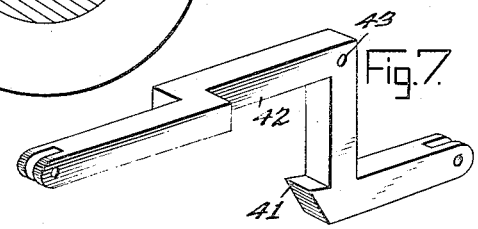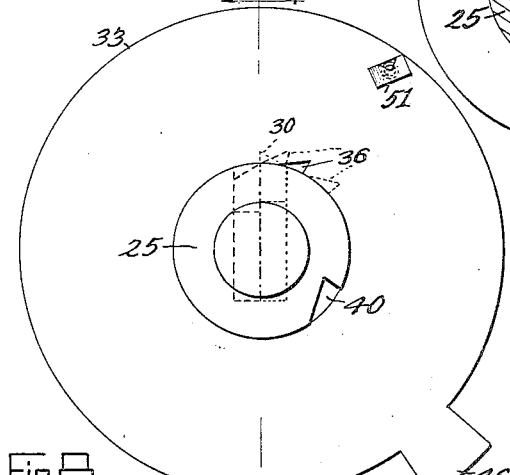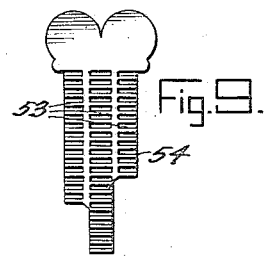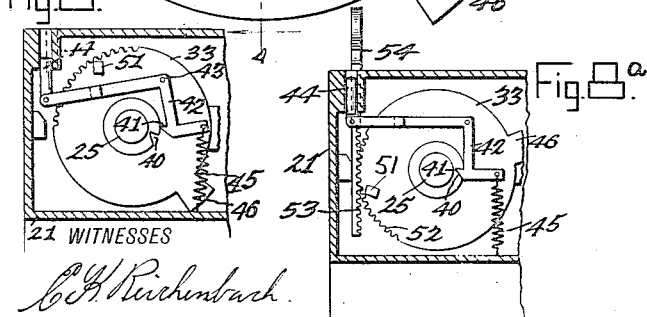

UNITED STATES PATENT OFFICE.

EDWARD C. LAMPSON, OF JEFFERSON, OHIO.

LOCK.

1,288,053.

Specification of Letters Patent.　　Patented Dec. 17, 1918.

Application filed December 28, 1916.　Serial No. 139,241.

*To all whom it may concern:*

Be it known that I, EDWARD C. LAMPSON, a citizen of the United States, and a resident of Jefferson, in the county of Ashtabula and State of Ohio, have invented certain new and useful Improvements in Locks, of which the following is a specification.

My invention relates to locks for use in connection with the controls of an automobile whereby the latter may be guarded against operation by an unauthorized person and thus prevent its theft and also its accidental operation by a mischievous child if left standing unguarded.

My lock may be utilized with any or all of the controls, including the clutch pedal, the service brake pedal, the gear shift lever, the emergency brake lever, and the electric system, it being illustrated in connection with the clutch pedal, the service brake pedal, and the electric system, in a simple form of embodiment subject, as will be understood, to structural modification.

My illustrated embodiment is of a negative type in that externally applied pressure locks the controls and manipulation of the lock elements opens the same, but this may be reversed if desired.

My invention is fully described in the following specification, of which the accompanying drawings form a part, in which like characters refer to like parts in each of the views, and in which:—

Fig. 4 is an enlarged sectional view, as on the line 4—4 of Fig. 5, showing the main elements of the lock;

Fig. 5 is an end view of Fig. 4, from the left hand;

Fig. 6 is a section taken on the line 6—6 of Fig. 4;

Fig. 7 is a detached view of a lever shown in Fig. 2 adapted for foot control to lock the motor controls;

Fig. 8 is a fragmentary section, similar to Fig. 2, showing a modified form of lock, key operated;

Fig. 8$^a$ is a view similar to Fig. 8, in a keyset position; and

Fig. 9 is a face view of the key, in one of its many possible combinations.

Figure 1:
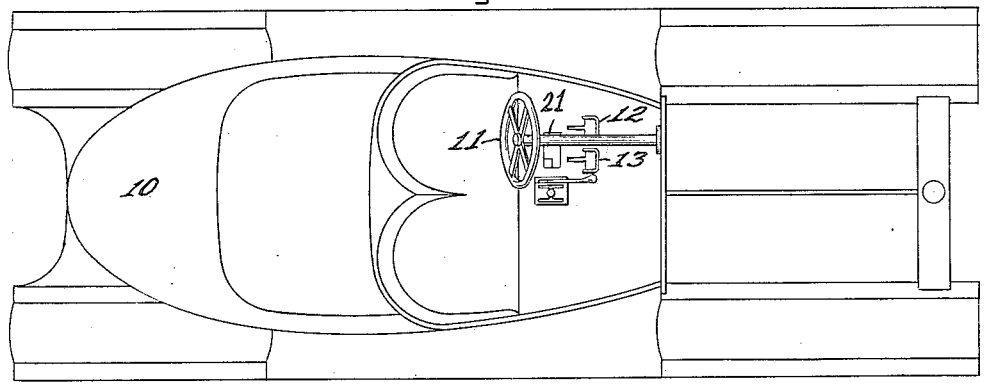
Figure 1 is a plan view of an automobile body provided with my invention in relative position with respect to the above mentioned pedals.
Figure 2:
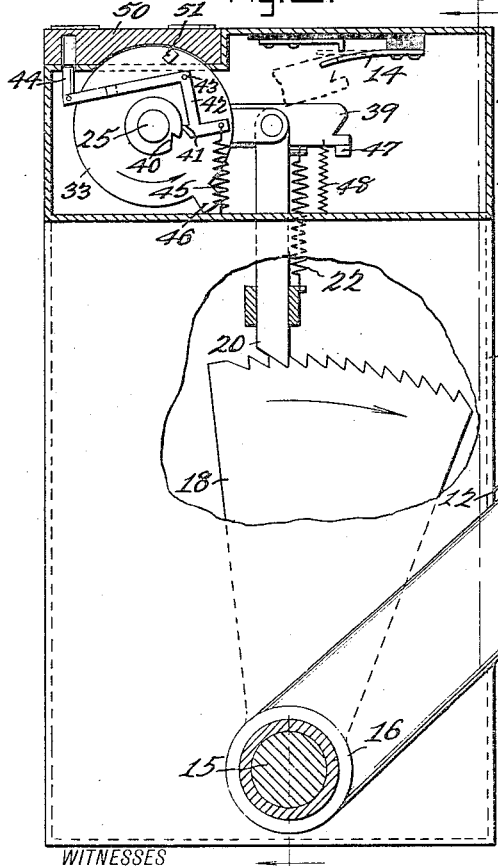
Fig. 2 is an enlarged side elevation of the lock, partly broken away, and partly in section on the line 2—2 of Fig. 3.

Referring to the drawings, 10 represents an automobile body having a steering wheel 11, a clutch pedal 12, a service brake pedal 13, and a switch 14 in the electric system, not shown, said clutch pedal 12 being secured to a shaft 15 journaled in suitable bearings, and said service brake pedal 13 being secured to a sleeve 16 freely movable on said shaft in order to allow independent pedal movement, said clutch pedal being out when in forward position and said brake being operative when in forward position, and said shaft and sleeve carry toothed sectors 17 and 18, respectively, the teeth of which are rearwardly directed, Fig. 2, and are adapted to be engaged by detents 19 and 20, respectively, suitably guided in a casing 21 and normally held toward the respective sectors by springs 22.

The detents 19 and 20 are in pivotal connection with arms on tubular members 23 and 24 rotatably fitted on a shaft 25 journaled in the casing 21, the member 23 having an internal longitudinally arranged notch 26 adapted to receive the wedge shaped outer edge of a bar 27 held in a groove 28 in the shaft 25 and normally forced outwardly by means of springs 29 to insure engagement of said bar in said notch when the two are brought into register in a manner to be described, and the member 24 is similarly provided with a notch 30 adapted to receive a bar 31 radially movable in the groove 28 and forced outwardly by means of springs 32, the tubular members 23 and 24 being independent of each other, as are also the bars 27 and 31 for a reason later pointed out.

Independently revoluble on the shaft 25 are a plurality of disks shown as three in number and designated 33, 34 and 35, each of which is provided with an internal notch, shown at 36 for the disk 33, adapted to receive a radially movable bar 37 forced outwardly of the groove 28 by means of springs 38, the peripheries of these disks bearing consecutively arranged numerals from "0" to "9" in the manner of disks on a numbering machine, and the notch 36 of each disk is optionally arranged with respect to the position of the "0" on the periphery thereof whereby the disks are selectively revolved to carry their internal notches 36 into register with the bar 37 to permit said bar to lock said shaft and disks together, changes in locations of the notches forming new combinations of degrees of movement of the disks, as all three notches 36 must be in line before the bar 37 can enter any one of them.

The right hand end of the shaft 25 carries a lug 39 adapted to bear against the switch 14 to close the electric circuit through the ignition system and, if used, through the electric starter, and the other end of said shaft is provided with a V-shaped notch 40 adapted to receive a tooth 41 on a bell crank 42 pivoted at 43 and having a button 44 pivoted to its outer end and extended through an opening in the top of the casing 21, Fig. 2, a spring 45 tending to force the tooth 41 toward the shaft 25 in order to cause the said tooth to enter the notch 40 when permitted to do so, and the disks 33, 34 and 35 are provided, each, with means for limiting backward movement thereof, as arms 46, whereby they may return to "0" after an operation, but this is not essential in view of the fact that a predetermined combination of the numerals on the peripheries thereof must have been attained before the notches therein are in line to receive the bar 37 and thus lock shaft and disks together.

The detents cannot move below the toothed sectors and, therefore, the notches in the tubular members 23 and 24 cannot rotate the shaft 25 beyond the limit fixed by the detents in the clockwise movement of said shaft, Figs. 5 and 6, and I may supplement this by normally holding the lug 30 against a stop 47 by means of a spring 48, Fig. 2, or in any other desired manner, and, in Fig. 4 I have shown pins 49 for insuring parallel movement of the bar 37 and thus prevent one end thereof from entering the respective disk notch 36 whereby shaft rotation could be accomplished before all of the disks had been set in the predetermined positions.

The casing 21 is open at the top for rendering the disks 33, 34 and 35 accessible for manipulation, a cover 50 being provided for the protection of said disks and having a bore therein for the reception of the button 44, and the disk 33 carries a spring-resisted lug 51 adapted, at the proper time, to trip the bell-crank 42 and thus release the tooth 41 from the notch 40 and thereby permit the shaft 25 to be returned to normal position with the detents locking the respective sectors against rearward movement although forward sector movement is possible if not at the forward limit because of the independently movable tubular members or collars 23 and 24.

Figure 3:
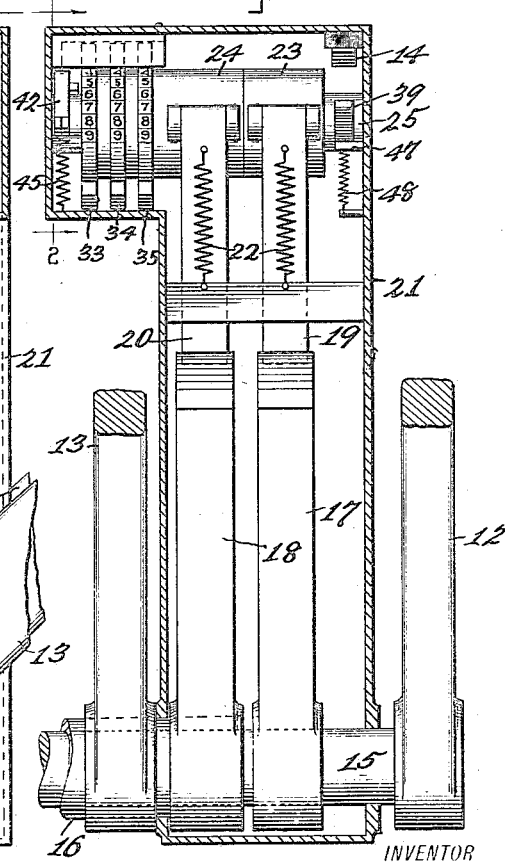
Fig. 3 is a section taken on the line 3—3 of Fig. 2.

When, with the parts in the positions shown in Figs. 2 and 3, the owner of the automobile desires to start the latter, he raises the cover 50 and revolves the disks 33, 34, and 35 to produce a predetermined combination of the peripheral numerals, thereby bringing all the disk notches in line and permitting the entrance of the bar 37 into all of said notches and, upon a slight turn of the disks anti-clockwise, the shaft 25 is rotated to carry the notch 40 into the position of the tooth 41 whereby said shaft is locked in this new position, and this shaft rotation raised the detents out of sector engagement, thereby unlocking the clutch and brake pedals and, also, the arm or lug 39 closed the electric circuit through the switch 14 and the automobile may be started.

The bell-crank 42 was rocked in this operation and the button 44 passed upwardly into the cover 50 and slight pressure on the button 44 will trip the bell-crank and permit the shaft 25 to return to initial position and thus again lock the sectors against rearward movement to again lock the clutch and brake pedals and again interrupt the electric system, but this may be accomplished as well by revolving the disk 33 to cause the lug 51 to rock the bell-crank, and it will be understood that the combination of numerals will be broken as soon as the said pedals have been unlocked, or upon again locking the same, so as to prevent an unauthorized person from learning the combination.

The form described is manually set, but in Figs. 8 and 9 I have illustrated the disks as key actuated in predetermined degrees to bring the disk notches in line and to rotate the shaft 25 to release the sectors, the disks being provided with peripheral teeth 52 adapted to be engaged by teeth 53 on a key 54, the key teeth being arranged in sets, one for each disk. The downward movement of the key revolves the said disks and rotates the shaft sufficiently far to be engaged by the tooth 41 and, when it is desired to lock the pedals as already described, all that is necessary is to re-insert the key to cause the lug 51 to rock the bell-crank to release the shaft and permit detent movement into locking positions, after which the key may be withdrawn from the lock.

While I have shown a disk controlled lock, it will be apparent that other types might be utilized to lock the pedal carrying shafts, or equivalents, against rotation in an unlocking position, and I may make other changes within the scope of the appended claims without departing from the spirit of the invention or sacrificing any of its advantages.

Having fully described my invention, what I claim as new, and desire to secure by Letters Patent, is:—

1. In a permutation lock, a movable element, means including a detent for holding said element against movement, a shaft, a collar revoluble thereon in pivotal connection with said detent, means for insuring collar movement with rotation of said shaft in one direction to release said detent, and a plurality of exteriorly revolved disks on and for rotating said shaft when said disks have been revolved into predetermined relative positions.

2. In a permutation lock, a movable element, means including a detent for holding said element against movement, a shaft, a collar revoluble therein in pivotal connection with said detent, said collar being provided with an internal notch, a radially movable spring actuated bar in said shaft adapted to enter said notch to revolve said collar in one direction of rotation of said shaft, and a plurality of exteriorly revolved disks on and for rotating said shaft when said disks have been revolved into predetermined relative positions.

3. In a permutation lock, a movable element, means including a detent for holding said element against movement, a shaft, a collar revoluble thereon in pivotal connection with said detent, means for insuring collar movement in one direction of shaft rotation, a plurality of internally notched, externally revolved, disks on said shaft, and a radially movable spring actuated bar in said shaft for engagement with all of the disk notches when said disks have been revolved into predetermined relative positions, whereby said shaft may be rotated upon subsequent revolution of said disks.

4. In a permutation lock, a movable element, means including a detent for holding said element against movement, a shaft, a collar revoluble therein in operative connection with said detent, means for moving said collar with said shaft in one direction of movement of the latter, exteriorly revolved disks on and for rotating said shaft when said disks have been moved into predetermined relationship, and means for locking said shaft in the position into which it had been rotated by said disks.

5. In a permutation lock, a movable element, means including a detent for holding said element against movement, a shaft, a collar revoluble therein in operative connection with said detent, means for carrying said collar with said shaft in one direction of shaft rotation, exteriorly revolved disks on and for rotating said shaft when said disks have been revolved into predetermined relationship, means for locking said shaft in the new position to hold said detent in inoperative position, and exteriorly controlled means for rendering said shaft locking means inoperative to permit the return of said detent into engagement with said movable element.

6. In a permutation lock, a movable element, a toothed sector movable with the element, a detent for holding the sector against movement, and a plurality of key actuated revoluble disks controlling the said detent.

7. In a permutation lock, a movable element, a toothed sector movable with the element, a detent for holding the sector against movement, a plurality of revoluble disks controlling the detent and provided with peripheral teeth, and a key provided with teeth for engaging the teeth of the disks to revolve the same.

8. In a permutation lock, a movable element, a toothed sector movable with said element, a detent for holding the sector against movement, a plurality of revoluble disks provided with peripheral teeth, means for controlling the detent from the disks, and a key provided with teeth for engaging the teeth of the disks to operate the same.

9. In a permutation lock, a movable element, a toothed sector movable with the element, a detent for holding the sector against movement, a plurality of revoluble toothed disks, means for controlling the detent from the disks, a toothed key for engaging the teeth of the disks to operate the said disks, and means for moving the detent into inoperative position.

10. As an article of manufacture, a permutation lock, comprising a casing, a shaft rotatable therein, a movable element on said shaft, means for locking said element, and a plurality of disks revoluble through different lengths of arcs into predetermined relationship to thereafter release said locking means.

11. As an article of manufacture, a permutation lock, comprising a casing, a shaft rotatable therein, a movable element on said shaft, means including a spring controlled detent for locking said element, a plurality of disks revoluble through different lengths of arcs into predetermined relationship to thereafter release said detent, and means for holding said detent in released position.

12. As an article of manufacture, a permutation lock, comprising a casing, a shaft rotatable therein, a movable element on said shaft, means including a detent for locking said element, a plurality of disks revoluble through different lengths of arcs into predetermined relationship to thereafter release said detent, means for holding said detent in released position, and externally operated means for rendering said detent holding means inoperative to permit the detent to move into operative position.

EDWARD C. LAMPSON.